Dec. 11, 1951        H. A. HAGOPIAN        2,577,963
BARBECUE GRILL

Filed Oct. 12, 1948        2 SHEETS—SHEET 1

INVENTOR.
HAIG A. HAGOPIAN
BY Huebner, Beehler,
Worrel, Herzig & Caldwell
ATTORNEYS Dec. 11, 1951   H. A. HAGOPIAN   2,577,963
BARBECUE GRILL
Filed Oct. 12, 1948   2 SHEETS—SHEET 2

INVENTOR.
HAIG A. HAGOPIAN
BY Huebner, Beehler
Worrel, Herzig & Caldwell
ATTORNEYS Patented Dec. 11, 1951

2,577,963

UNITED STATES PATENT OFFICE 2,577,963

BARBECUE GRILL

Haig A. Hagopian, Fresno, Calif.

Application October 12, 1948, Serial No. 54,111

2 Claims. (Cl. 126—25)

This invention relates to grills and more particularly to barbecue grills for outdoor use.

In conventional barbecue grills, the capacity is generally inconveniently limited. Conventional barbecue grills employing roasting spits are usually difficult to adjust so as to regulate the source of heat relative to the spit or spits to obtain even roasting or barbecuing of the meat thereon. In the conventional barbecue grill, it is also usually difficult to empty the ashes and coals which are generally contained in a stationary device usable only at a fixed location.

One object of the invention is to provide an improved barbecue grill that is readily portable.

Another object is to provide means for mounting and elevationally controlling a firebox relative to rotatably mounted spits.

Another object of the present invention is to provide a barbecue grill having a firebox housing with a door opening in one end thereof which is automatically opened when the firebox is lowered away from the spits for the convenient removal or replacement of the firebox therethrough.

Other objects and advantages of the present invention will become apparent in the following description, taken in connection with the accompanying drawings in which.

Figure 1:
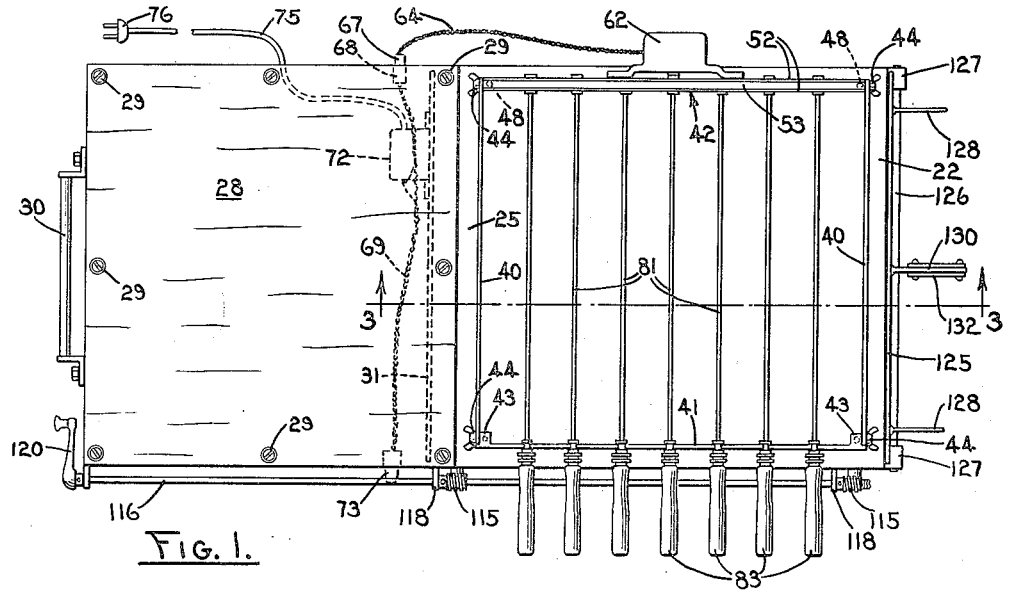
Fig. 1 is a top plan view of a barbecue grill made in accordance with the principles of the present invention.

Referring to the details of the drawings, the barbecue grill comprises an under supporting structure, indicated generally by the reference numeral 10, having a pair of vertical front legs 11 and a pair of vertical rear legs 12 held rigidly in spaced relation by a plurality of horizontal stretchers 13 welded therebetween. A wheel 14 is rotatably mounted on the lower end of each of the front legs 11 with a guard 15 securely located over each wheel.

Figures 2, 6:
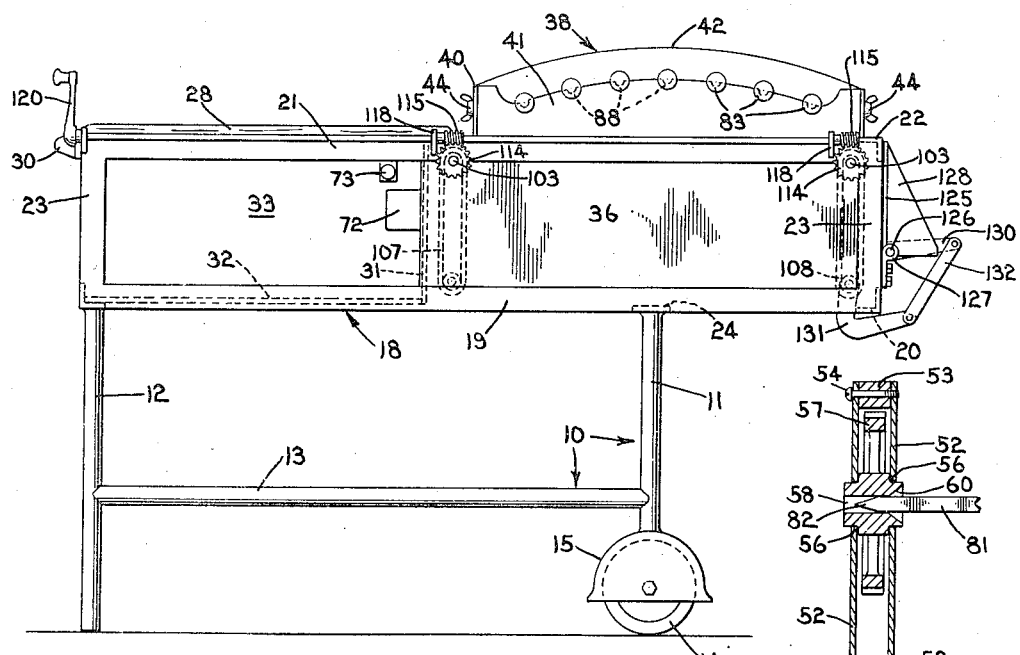
Fig. 2 is a side, elevational view of the barbecue grill.
Fig. 6 is an enlarged vertical transverse sectional view through a portion of the spit supporting frame showing the gear drive and support therefor, taken along line 6—6 in Fig. 1.

In the description of the barbecue grill it will be described as having a forward and rearward end and a front and rear side. The grill being portable and usually movable in one direction, or to the right in Figs. 1 and 2, the forward end is the end to the right in Figs. 1 and 2. The grill also has an operable or front side from which the spits are removed and relocated and the forward side is the lower side, as viewed in Fig. 1, or the near side as viewed in Fig. 2.

A frame 18 is supported on the supporting structure 10 and comprises a pair of lower longitudinal frame members 19 held in spaced relation by means of a pair of lower transverse end members 20 welded therebetween. A pair of upper longitudinal frame members 21 are held in spaced parallel relationship by means of a pair of upper transverse end frame members 22 secured therebetween. Vertical corner frame members 23 are welded between each of the upper and lower rectangular frames forming an integral frame structure. The frame 18 is provided further with a cross piece 24 welded horizontally and transversely between the pair of lower frame members 19 and another cross piece 25 is secured horizontally and transversely between the upper longitudinal frame members 21. A wooden table top 28 is located over approximately the rear half of the frame 18 and is held in place by means of a plurality of screws 29 passing therethrough and downwardly into tapped openings in the frame members 19, 22, and 25.

A handle 30 is attached to one of the frame members 22 at the rear end of the barbecue grill whereby the grill may be manually moved from place to place on the wheels 14 on which it is movably supported. A sheet metal liner 31 is located within the frame structure 18 and is secured therein against three sides of the portion of the frame structure 18 directly beneath the table top 28 and a sheet metal bottom 32 is secured on the lower frame members 19 and 20 whereby a compartment 33 is formed under the table top 28 with an open front for placement and temporary storage of articles of food or condiments therein. The forward portion of the frame structure 18 is provided with sheet metal liners 36 located against the inner sides of the angle members 19 and 20 thereof and secured thereto on the remaining three sides whereby an enclosed firebox housing is formed having an open lower and upper side for vertical passage of air therethrough.

A spit supporting frame, indicated generally by the reference numeral 38 is adapted to be located on the forward end of the frame structure 18 over the firebox housing and comprises a pair of sheet metal, vertically located, and transversely extending end members 40. A vertically located longitudinally extending front side member 41 and a vertically located longitudinally extending rear side member 42 are secured between the ends of the end members 40. This is accomplished by providing a vertically located block 43 integrally with the ends of the front side member 41 and by passing thumb screws 44 through the ends of each end member 40 and into tapped openings in the rear side member 42 and into the blocks 43. Thus a rectangular spit supporting frame 38 is formed adapted to rest on the upper side of the forward portion of the frame structure 18 and on the upper longitudinal frame members 21, on one of the upper transverse end members 22 and the cross piece 25. The spit supporting frame 38 is held in fixed position on the frame structure 18 by providing a plurality of pegs 48 extended downwardly from adjacent each corner of the spit supporting frame and projecting downwardly into a like plurality of similarly located openings 49 through the upper frame members of the frame structure 18. The spit supporting frame 38 may be entirely removed from the frame structure 18 by simply lifting it therefrom.

Figure 4:
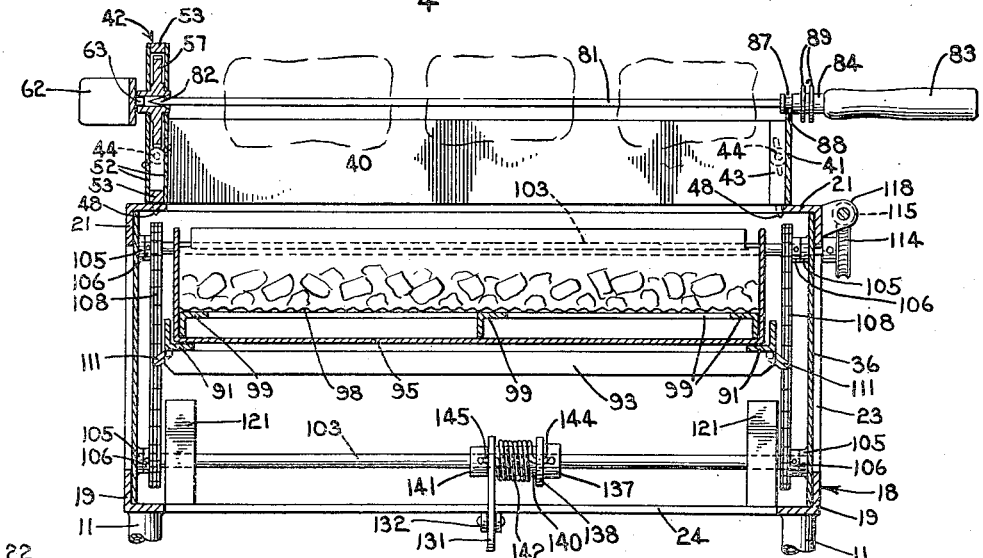
Fig. 4 is a vertical, transverse, sectional view of the grill, taken on line 4—4 in Fig. 3.
Figure 5:
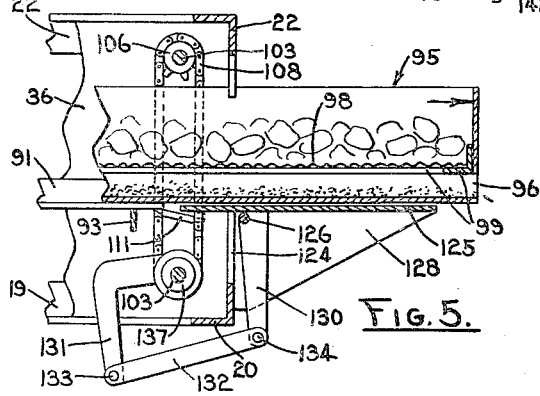
Fig. 5 is a fragmentary, longitudinal, vertical, sectional view through the grill showing the firebox housing door in open position with the firebox partially withdrawn therefrom.

As shown in Fig. 4, the rear side member 42 of the spit support 38 comprises a pair of spaced plates 52 held in spaced relationship by means of a plurality of spacers 53 and secured together by means of a plurality of screws 54 passed through the plates and through the spacer. A plurality of horizontally aligned openings 56 are formed through each of the spaced plates 52 and a spur gear 57 is journaled in each pair of aligned openings 56 and is rotatable within the gear housing formed by the spaced plates 52 and the spacers 53. The plurality of spur gears 57 are located whereby each meshes with an adjacent spur gear whereby they have driving and driven interconnection. Each of the spur gears 57 is provided with a square axial opening 58 therethrough which is countersunk at the end thereof facing the opposite side member 41 of the spit supporting frame whereby the pointed end of a spit, later to be described, may be easily inserted into each of the square openings 58.

An electric motor 62 is attached to the outer side of the outer plate 52 with the drive shaft 63 thereof in axial alignment with one of the spur gears 57 and with the drive shaft extending in driving connection into the square opening 58 thereof whereby the train of gears 57 has driven connection with the motor. The electric motor 62 is wound in such a way that it may be energized and driven by 6 volts of either alternating or direct current.

The electric motor 62 is energized by providing a pair of conductors 64 electrically connected thereto having a plug 67 electrically connected to the opposite end thereof. This plug 67 is adapted to be received into a socket 68 secured to one side of the frame structure 18. A pair of conductors 69 are electrically connected at one end to the socket 68 and connected to the secondary 6 volt terminals of a 110 volt transformer 72 secured to the plate 31 within the housing 33, with a rheostat or potentiometer connected in series with the conductor 69. The rheostat controls the speed of rotation of the motor 62. The rheostat 73 is attached to one of the upper longitudinal frame members 21 and conveniently located within the forward opening of the compartment 33. The primary of the transformer 72 has a pair of conductors 75 electrically connected thereto having a plug 76 electrically connected to the other end thereof whereby it may be plugged into a 110 volt electrical outlet, as generally found in homes. Thus with the motor electrically connected, as described, and with the plug 76 plugged into a 110 volt outlet the motor is driven with 6 volts of alternating current. When it is desired to drive the electric motor with 6 volts of direct current, as when the grill is used at a picnic or on a camping trip where battery current is available but not regular 110 volt house current, the plug 67 is withdrawn from the socket 68 and plugged into an outlet in an automobile or inserted into a socket which is electrically connected to a 6 volt storage battery.

A plurality of spits 81 are each provided with a square shank having a pointed end 82, each of which is adapted to be received into the square opening 58 of one of the spur gears 57. Each spit is provided with a wooden handle 83 at the end opposite the pointed end with a ferrule 84 located around the inner end thereof for attachment to the spit. Each ferrule has an annular groove 87 formed in circumscribing relation therein. The side 41 has a plurality of semi-circular bearings 88 formed upwardly disposed therein each coaxially related and juxtapositioned a spit receptacle 58. Each of the spits is mounted for rotation by insertion of the sharpened end thereof into a receptacle and by resting the ferrule of each spit in the bearing corresponding with the receptacle with which driven connection is made. Driven connection is maintained with the respective receptacles by resting the ferrules of the spits on the bearings with the side 41 received by the grooves 87 in the ferrules. Each of the ferrules is provided with a plurality of longitudinally spaced, annularly located heat dissipating discs 89 whereby heat absorbed in each spit 81 and transmitted to each ferrule 84 will be somewhat radiantly dissipated thereby.

It will be noted that the plurality of spits 81 are located in arcuate relation over a firebox hereinafter described, with the middle spits located higher than the terminal spits. This provides for even distribution of heat from a fire in the firebox to all of the spits.

A firebox supporting frame 90 comprises a pair of spaced parallel side angle iron members 91 extending longitudinally of the barbecue grill and a single rear angle iron member 92 welded therebetween at their rearward ends. The forward ends of the side angle members 91 are held in spaced relationship by means of a bar 93 welded therebetween below said members. The rear angle iron member 92 and the side angle iron members 91 have relatively inwardly extending flanges and upwardly extending channels forming a firebox receiving channel open at the forward end of the barbecue grill. Thus the firebox 90 is in the form of a shelf open at its forward end to slideably receive a firebox 95 from the forward end thereof. The firebox 95 is made of sheet metal bent and welded into the form of a shallow, rectangular tray. An opening 96 is formed through the forward end of the fire box 95 adjacent the bottom thereof whereby air may pass therethrough for the combustion of ignitable contents positioned in the firebox and whereby the ashes may be easily removed therefrom. A grate 98, made from a substantially square piece of expanded sheet metal, similar to metal lath, is supported in horizontal spaced relationship above the bottom of the firebox by means of a plurality of angle members 99 secured to the firebox. The grate is adapted to support ignitable material such as wood, charcoal, pressed coal blocks or the like to furnish the heating medium for the roasting, barbecuing or cooking of meat or the like supported on the plurality of spits 81.

Means are provided for controllably raising and lowering the firebox toward or away from the plurality of spits and the food supported thereon whereby the temperature of the heat applied to the material being cooked may be regulated. This control means comprises two pair of horizontally extending and relatively vertically located shafts 103 which are rotatably mounted near their ends in bearings 105 welded or otherwise secured against the inner faces of the sheet metal liners 36 of the firebox housing. A sprocket 106 is secured to each shaft near the outer end thereof and within the firebox housing with an endless chain 107 extending around and between each rearward pair of vertically located sprockets 106 and another endless chain 108 extending around and between each forward pair of vertically located sprockets 106. The firebox supporting frame 90 is supported for vertical movement on each chain 107 and 108, by providing a pair of supporting bars 110 which are welded to the underside of the rearward end of the firebox supporting frame 90 and which have a reduced portion which extends into the forward run of each rearward chain 107. Another pair of supporting bars 111 are each attached to the forward end of the firebox supporting frame 90 and extend substantially horizontally therefrom having a reduced portion which extends into the forward run of each of the forward chains 108. Thus by simultaneous rotation of each of the shafts 103, the forward runs of each of the chains 107 and 108 move simultaneously in the same direction moving the firebox supporting frame 90 therewith.

The shafts 103 are manually rotated simultaneously by extending each upper shaft exteriorly of the frame 18 and securing a worm wheel 114 to the extending end of each upper shaft. A worm 115 is adapted to mesh with each worm wheel 114 and is secured in rotatable relation on a shaft 116 which is rotatably mounted in a plurality of bearing plates 118 secured to and extending from one of the upper longitudinal frame member 21. A crank 120 is secured to the rearward end of the shaft 116 whereby the worms, worm wheels, sprockets and chains may be manually operated simultaneously for the regulated vertical movement of the firebox supporting frame and the firebox supported thereon. A pair of vertically located stops 121 are secured to the upper side of the cross member 24 and extended upwardly therefrom limiting downward motion of the firebox supporting frame 90, by engagement therewith on downward motion, whereby the firebox supporting frame is properly vertically located for the insertion and removal of the firebox therein through a door opening hereinafter described.

It will be noted that by supporting the firebox on the forward runs of each of the simultaneously operable chains 107 and 108 that the firebox is vertically moveable toward and away from the spits thereabove with a rectilinear motion whereby the firebox is maintained in proper horizontal position without tilting.

The firebox housing is enclosed on three sides by the sheet metal liner 31 and the sheet metal liners 36 providing an open forward end constituting a door opening 124 through which the firebox is passed for placement on the firebox supporting frame or for removal therefrom. This door opening 124 is adapted to be closed by means of a sheet metal door 125 which is securely attached to a horizontally located pivot pin 126 which is pivotally mounted at its ends in bearings 127 secured to the forward side of the vertical end frame members 23. A pair of vertically located forwardly extending wings 128 are secured in spaced relationship to the forward side of the door 125, the lower edge of which is adapted to contact the forward end frame member 29 to limit the outward pivotal motion thereof and to permit the door to move outwardly only to a substantially horizontal position. An arm 130 is securely attached to the forward face and centrally of the door 125 and extends forwardly and normal thereto. A lever 131 is freely rotatable on lower forward shaft 103 with a link 132 pivotally connected at 133 to the free end thereof, the other end of the link being pivotally connected at 134 to the outer free end of the arm 130. Thus the door 125 is moveable to open and to closed position by rotative motion of the lever 131.

The door 125 is adapted to be closed whenever the firebox supporting frame 90 and the firebox 95 supported thereon are moved to an upper position whereby the firebox housing is enclosed on all four sides while meat or the like is being barbecued or roasted on the plurality of spits thereabove. The door is also adapted to be opened automatically when the firebox supporting frame 90 and the firebox 95 supported thereon are at or approximately at their lowermost position whereby the firebox may be slidably removed forwardly from the firebox supporting frame through the door opening 124 for the emptying of the ashes or coals therefrom and for the reinsertion of the firebox onto the firebox supporting frame. This automatic opening of the door 125 is accomplished by providing a collar 137, having an annular ring 138 at one end thereof located around and secured to the forward lower shaft around which the lever 131 is located. A spacer 140 is located on the shaft between the collar 134 and the lever 131 whereby they are held in spaced relationship and another collar 141 is secured to the same shaft adjacent the other side of the lever 131 whereby the lever is located longitudinally of the shaft. A helical torsion spring 142 is located around the spacer 140 with one end 144 extending axially into an opening in the annular ring 138 of the collar 137 and the other end 145 of the spring extending through an opening through the lever 131.

Figure 3:
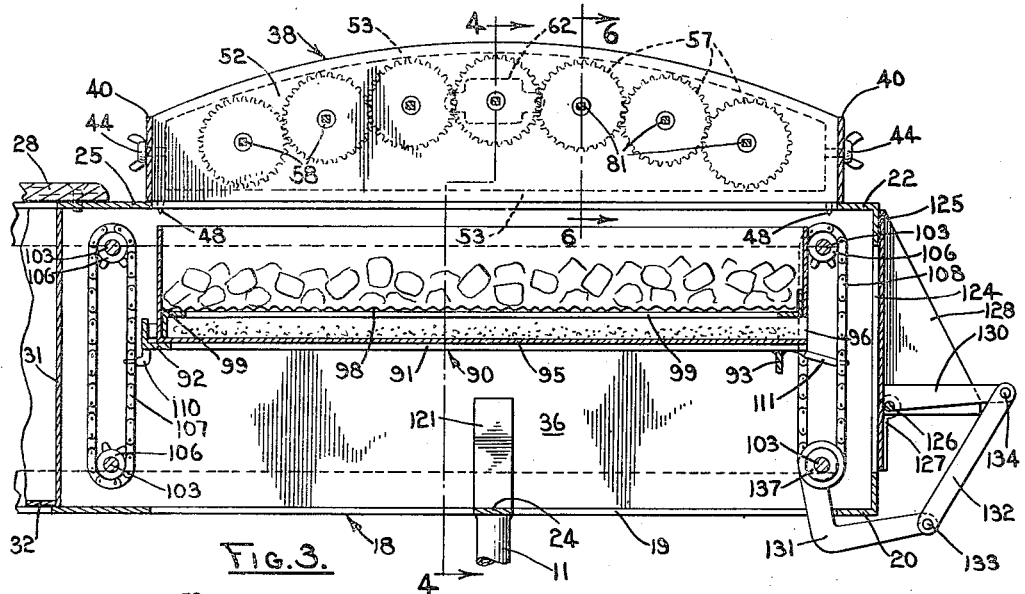
Fig. 3 is a fragmentary, longitudinal, vertical, sectional view of the barbecue grill, taken along line 3—3 in Fig. 1.

Whenever the firebox supporting frame 90 is in an upper position above its downward most position or approximately thereto, the torsion spring 142 is wound sufficiently yieldably to hold the door 125 in closed position in the door opening 124. As the firebox supporting frame is moved downwardly on rotation of each of the shafts 103 in a clockwise direction, as viewed in Fig. 3, the torsion spring unwinds, progressively relieving its torsional effect in yieldably holding the door in closed position, until as the firebox supporting frame 90 approaches its lowermost position, the torsion spring 142 becomes unwound sufficiently to move the door 124 to open horizontal position. With the door thus open and with the firebox supporting frame in its lowermost position the firebox 95 may be slidably removed forwardly from the firebox supporting frame through the door opening 124.

*Operation*

With the barbecue grill constructed as shown and described, the grill is supported on rotatable wheels at one end thereof and with a handle at the opposite end for convenience in moving the grill. By the use of the handle the barbecue grill may be trundled about as convenience dictates.

With the firebox located on the firebox supporting frame 90, a suitable fire is kindled within the firebox. Each spit is easily removed for placing the meat thereon by simply lifting the handle end of the spit first and subsequently moving the spit endwardly from engagement with its respective recess 88 in the spit supporting frame member 41. Meat or the like is thereafter impaled on the spit and the spit is replaced in rotative position on the spit supporting frame. Cuts of meat, roasts, fowl, or other meat and/or vegetables or alternate layers of each are pierced by one or more of the spits 81 and supported thereby for rotative motion over the fire.

The spits 81 are positioned for operation by inserting the sharpened ends 82 thereof into their respective openings 58 and subsequently lowering the handle ends 83 thereof to bring the annular grooves 87 into engagement with the semi-circular bearings 88 formed in the side 41. The enlarged portions of the ferrules at opposite sides of the grooves 87 maintain the spits in engagement with side 41 for operation.

The motor 72 is energized in either of the manners previously described and the chain of spur gears 57 are set in motion. It will be apparent that as the gears are rotated, the spits having engagement with the openings 58 are responsively rotated. It will further be apparent that the removal of one or the other of the spits in no way affects the continued rotation of the spits remaining in engagement with their respective openings.

By rotation of the crank 120 the firebox may be selectively raised and lowered to regulate the heat applied to the cuts of meat or the like. As the combustible material is burned air is drawn into the firebox 95 through the opening 96 in the forward end thereof whereby the combustible material obtains sufficient oxygen for combustion. As the combustible material is burned the ashes therefrom sift through the grate and accumulate on the bottom of the firebox.

When it is desired to add more combustible material, or when it is desired to empty the accumulation of ashes from the firebox, the handle 120 is rotated moving the firebox supporting frame 90 to its lowermost position. As the firebox supporting frame approaches its lowermost supporting position, the helical torsion spring 142 becomes unwound sufficiently to open the door 125 from the door opening 124. When the firebox supporting frame 90 reaches its lowermost position against the upper end of the top members 121, the firebox may be slideably moved forwardly therefrom through the door opening for convenience in refueling and/or emptying. Upon return of the firebox to original position, the crank 120 is operated to move the firebox to a raised position in closer proximity to the spits and in so doing the torsion spring 142 is wound tighter until the force thereof rotates the door 125 to closed position over the door opening 124. The firebox housing is then substantially closed at its four opposite vertical sides.

The spit supporting frame 38 is removeable from the barbecue grill frame structure 18 simply by lifting the spit supporting frame vertically therefrom, removing the pegs 48 from their respective openings 49 in the top side of the frame structure 18. The spit supporting frame 38 may be disassembled to a knocked down condition by removing the thumb screw 44 from their respective tapped openings whereby the frame members may be nested together in a compact relation for convenient transportation.

From the foregoing it will be seen that a barbecue grill has been devised which is portable whereby it may be moved to any desired location and which has an increased capacity over the conventional type of barbecue grill and in which the fire box thereof is adjustable toward or away from the rotatable spits whereby regulated and even roasting or barbecuing is obtained. It will also be seen that a barbecue grill has been devised in which the door to the firebox thereof is moved automatically to open or closed position by the positioning of the firebox, with the door opening when the firebox is moved to its lower position for the convenient removal and replacement of the firebox for ash emptying and fuel replenishing purposes. The invention also provides for a plurality of spits that are rotatably driven by an electric motor whereby convenient even roasting and barbecuing is obtained and in which each spit is easily removeable during the operation without affecting operation of the other spits. The invention provides also for means whereby the spit supporting frame and the drive mechanism for the rotatable spits is removeable from the supporting structure of the barbecue grill whereby the spits and supports therefor may be conveniently used at picnics or on camping trips. The spit supporting frame is designed to be disassembled whereby it may be stored or conveyed compactly.

Although I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent devices and structures.

Having described my invention what I claim as new and desire to secure by Letters Patent is:

1. The combination of a firebox housing having a door opening in an end thereof, a vertically moveable firebox within the housing, means for moving the firebox vertically including a rotatable shaft, a door pivotally mounted in the housing adapted to close the door opening in one of its positions, a lever pivotally connected to the door and rotatably supported on the shaft, a helical torsion spring located around the shaft under initial tension having one end anchored to the shaft and the other end of which is connected to the lever, the spring being adapted to receive increased tension as the firebox is raised moving the door to closed position in the door opening and adapted to receive decreased tension as the firebox is lowered moving the door to open position.

2. A barbecue grill comprising a firebox housing having a door opening therein, a door pivotally mounted on the firebox housing moveable to open position and to closed position over the door opening, a firebox supporting frame mounted in the housing for elevational movement, a firebox slidably supported on the firebox supporting frame and removable therefrom through the door opening when the door is open, means for raising and lowering the firebox supporting frame including a rotatable shaft, a lever journaled on the shaft and pivotally connected at its outer end to the door, and a helical torsion spring located around the shaft with one end connected to the shaft and the other end connected to the lever to tighten as the shaft is rotated to raise the supporting frame and to loosen as the shaft is rotated to lower the supporting frame whereby the door is closed when the supporting frame is elevated and opened when the frame is lowered.

HAIG A. HAGOPIAN.

REFERENCES CITED

The following references are of record in the file of this patent:

UNITED STATES PATENTS

| Number | Name | Date |
|---|---|---|
| 237,107 | Gillett | Feb. 1, 1881 |
| 839,236 | Vartanian | Dec. 25, 1906 |
| 1,702,900 | Humphrey | Feb. 19, 1929 |
| 2,114,697 | Babin | Apr. 19, 1938 |
| 2,213,483 | Benson | Sept. 3, 1940 |
| 2,334,847 | Spiers | Nov. 23, 1943 |
| 2,425,036 | Howe | Aug. 5, 1947 |
| 2,473,569 | Cast | June 21, 1949 |

FOREIGN PATENTS

| Number | Country | Date |
|---|---|---|
| 41,095 | Switzerland | Aug. 14, 1907 |
| 370,105 | Germany | Feb. 27, 1923 |